US008433209B2

(12) United States Patent
Ito

(10) Patent No.: US 8,433,209 B2
(45) Date of Patent: Apr. 30, 2013

(54) INSPECTION APPARATUS, CONTROL METHOD OF INSPECTION APPARATUS, AND STORAGE MEDIUM

(75) Inventor: Koichi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 12/960,398

(22) Filed: Dec. 3, 2010

(65) Prior Publication Data

US 2011/0135321 A1 Jun. 9, 2011

(30) Foreign Application Priority Data

Dec. 8, 2009 (JP) ................................ 2009-278501

(51) Int. Cl.
*G03G 15/00* (2006.01)
*G06K 15/00* (2006.01)

(52) U.S. Cl.
USPC ........................................... 399/15; 358/1.14

(58) Field of Classification Search ................ 399/9, 15, 399/297–301; 358/1.14; 382/112
See application file for complete search history.

(56) References Cited

U.S. PATENT DOCUMENTS

2004/0066526 A1* 4/2004 Inoo et al. .................... 358/1.14
2008/0080874 A1* 4/2008 Murayama et al. ............... 399/9

FOREIGN PATENT DOCUMENTS

JP 6-266892 A 9/1994
JP 11-39492 A 2/1999

* cited by examiner

*Primary Examiner* — Hoan Tran
(74) *Attorney, Agent, or Firm* — Canon USA, Inc., IP Division

(57) ABSTRACT

If a print misregistration amount on a sheet is larger than a predetermined threshold before determining whether a printed image is appropriate or not, an abnormal status of the image printed on the sheet is detected without correcting image data for inspection. A control method for controlling a detecting apparatus for inspecting a print status of an image printed on a sheet by a printing apparatus includes detecting, in a case where it is determined that a print misregistration amount of the image printed on the sheet with respect to the sheet is larger than a predetermined threshold, an abnormality of the print status of the image read by a reading unit without performing correction.

7 Claims, 7 Drawing Sheets

INSPECTION APPARATUS, CONTROL METHOD OF INSPECTION APPARATUS, AND STORAGE MEDIUM

BACKGROUND OF THE INVENTION

1. Field of the Invention

The present invention relates to an inspection apparatus, a control method of the inspection apparatus, and a storage medium.

2. Description of the Related Art

Conventionally, a commercial printing industry issues printed matters through procedures, such as receiving manuscript, design or layout, comprehensive layout (presentation for a printed output), proofreading (layout correction or color correction), outputting proof (proof printing), block copy preparation, printing, post-processing, and delivery. In the above described procedures, the commercial printing industry mainly uses a large-scaled printing apparatus such as an offset plate printing apparatus, and needs block copy preparation. However, a block copy is created once, correction thereof is not easy, and it is enormously disadvantage in costs. Careful proofing (layout check or color check) is required, and a certain period for creating the printed matter is necessary. On the other hand, increase in speed and quality of an electrophotographic image forming apparatus (printing apparatus) or an inkjet image forming apparatus is remarkable. Then, a market appears to handle a job called a print on demand (hereinafter, referred to as a POD) with a lot relatively smaller than a job handled by the printing apparatus without using a large-scaled apparatus for short delivery, to compete against the commercial printing industry.

The POD market realizes digital printing using electronic data with a digital image forming apparatus such as a digital copying machine or a digital multifunction peripheral, and the level is closer to that of the printing industry to some degree by using a computer. In the printing industry or the POD market, inspection operation for checking whether a printed matter to be delivered to a client has no defect is not automated, and an operator manually checks and inspects the printed matter in the current situation. However, in the case of a printed matter having several hundreds pages, inspection of all the pages in detailed requires enormous time and labor. Rough inspection operation such as partial pick-up from the printed matter may cause a problem such as an oversight of small printing errors, misprints, and dirt on paper. In order to solve such a problem, a technique for automating the inspection operation of the printed matter is demanded. A technique for automating the inspection operation is known to inspect a printed matter by comparing an inspection image for inspecting the printed matter with an image obtained by capturing the printed matter (refer to Japanese Patent Application Laid-Open No. 11-39492).

With the technique, in a step of obtaining an image by capturing a printed matter, a skewed image may be captured and obtained as a result of skewing paper or misregistration of paper in a lateral direction during conveyance of the printed matter. If the skewed image is compared with the inspection image, an image originally correctly printed can be determined as a print defect and inspection efficiency can deteriorate. Accordingly, such a technique is known to detect a skew amount of paper, correct a captured image based on the detected skew amount, and compare the corrected image with the inspection image (refer to Japanese Patent Application Laid-Open No. 6-266892).

However, with the technique for detecting the skew amount, correcting the captured image based on the detected skew amount, and correcting the image, misregistration of a print position on paper is not corrected. Therefore, a printed matter which is normally determined as an appropriate product by a user may be determined as a print defect and the inspection efficiency thus deteriorates. When inspection of the printed matter is performed after correcting the misregistration of the print position on paper, the image is corrected total twice. With the current technology, the image correction takes a long time and the inspection efficiency consequently becomes down.

SUMMARY OF THE INVENTION

According to an aspect of the present invention, a detecting apparatus for inspecting a print status of an image printed on a sheet by a printing apparatus includes a reading unit configured to read the image printed on the sheet by the printing apparatus, a calculating unit configured to calculate a print misregistration amount of the image printed on the sheet with respect to the sheet based on image data read from the sheet by the reading unit, a determining unit configured to determine whether the print misregistration amount calculated by the calculating unit is larger than a predetermined threshold, a correcting unit configured to correct, when the determining unit determines that the print misregistration amount is less than or equal to the predetermined threshold, the image data read by the reading unit to image data comparable with image data rasterized by the printing apparatus to determine the print status of the image, and a detecting unit configured to detect, when the determining unit determines that the print misregistration amount of the image printed on the sheet is larger than the predetermined threshold, an abnormality of the print status of the image read by the reading unit without performing correction by the correcting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
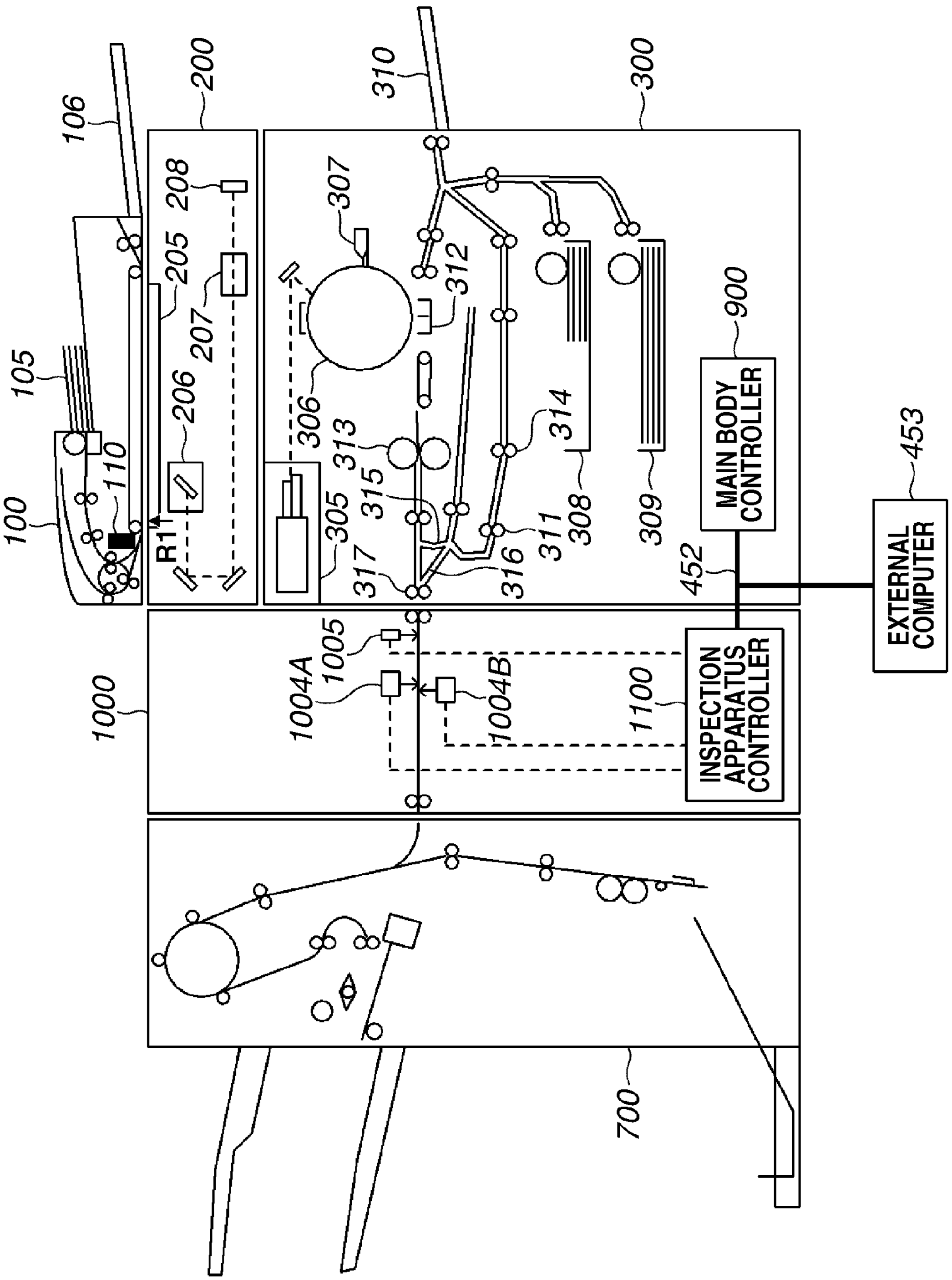
FIG. 1 illustrates a configuration of an image forming system including an inspection apparatus according to an exemplary embodiment of the present invention.

FIG. 1 illustrates a configuration of an image forming system including an inspection apparatus according to an exemplary embodiment of the present invention. An image forming apparatus in the example includes an image reader 200 and a printer unit 300. In the image forming apparatus in the example, a document feeding device 100 is attached to the top of the image reader 200.

Referring to FIG. 1, the document feeding device 100 sequentially feeds documents set on a document tray 105, starting with a first page, one by one, and conveys them onto a document positioning glass plate 205 via a bent path.

A method for reading a one-sided document includes a document fixed-reading mode in which the document is read by conveying and stopping a rear edge of the document to a reading position R1 on the document positioning glass plate 205 and moving a scanner unit 206 from the left to the right. Further, the method for reading the one-sided document includes a document feeding-reading mode in which a document is conveyed to the reading position R1 at a certain reading speed, and the document is read by the scanner unit 206 which is fixed at the reading position R1. Then, in both the modes, the read document is discharged to a sheet discharge tray 106.

A method for reading a two-sided document includes a method for reading a front surface of the document with the scanner unit 206 and reading a rear surface with an optical unit 110 disposed in the document feeding device 100. The details are described below. The optical unit 110 includes an image sensor and a light source (not illustrated).

Figure 2:
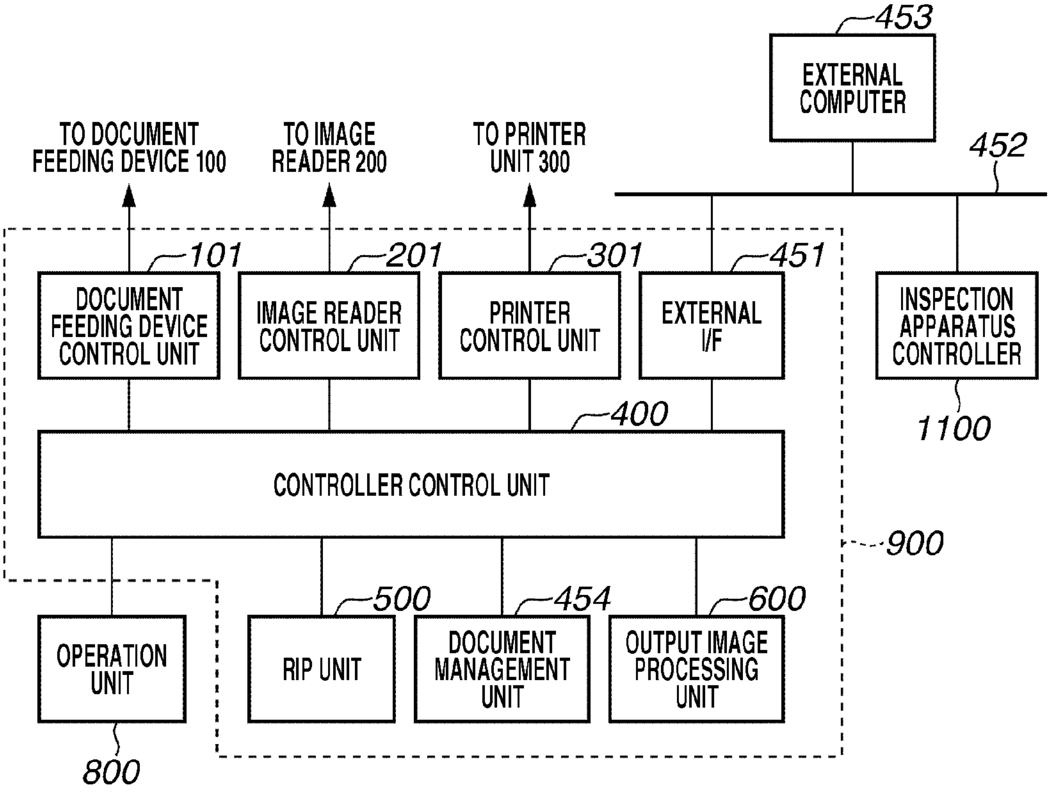
FIG. 2 illustrates the entire configuration of a control unit in an image forming apparatus.

An image of the document read by an image sensor 208 via a lens 207 is subjected to image processing, is stored to a hard disk, and is transmitted to an exposure control unit 305 via a printer control unit 301 (refer to FIG. 2). The exposure control unit 305 outputs a laser beam corresponding to an image signal.

When a photosensitive drum 306 is irradiated with the laser beam, an electrostatic latent image is formed on the photosensitive drum 306. The electrostatic latent image formed on the photosensitive drum 306 is developed by a developing unit 307. A transfer unit 312 transfers a developer on the photosensitive drum 306 on a sheet fed from any of cassettes 308 and 309, a manual sheet feeding unit 310, and a two-sided conveyance path 311.

The sheet on which the developer is transferred is guided to a fixing unit 313. The fixing unit 313 performs fixing processing of the developer. A flapper (not illustrated) guides the sheet passing through the fixing unit 313 to a path 314 from a path 315 once, and when a rear edge of the sheet passes through the path 315, the sheet is guided to a discharge roller 317 from a path 316 by switchback.

Thus, a surface on which the developer is transferred faces down, and the discharge roller 317 enables the sheet to be discharged from the printer unit 300. This processing is referred to as inversed discharge. The sheet is discharged with facing down, so that image formation can be sequentially performed in correct page order starting with the first page when images read from a plurality of documents by the document feeding device 100 are printed.

When an image is formed on a hard sheet, such as an overhead projector (OHP) sheet fed from the manual sheet feeding unit 310, the sheet is discharged with the surface on which the developer is transferred facing upward from the discharge roller 317 without being guided to the path 315. In the case of image formation on two sides of a sheet, the sheet is guided from the fixing unit 313 to the paths 315 and 314, switched back just after the rear edge of the sheet passes through the path 315, and guided to the two-sided conveyance path 311 by the flapper (not illustrated). The transfer unit 312 transfers again the electrostatic latent image to the sheet guided to the two-sided conveyance path 311, and the fixing unit 313 performs fixing processing of the sheet.

One cyclic path starting from the transfer unit 312 and returning to the transfer unit 312 via the two-sided conveyance path 311 is divided into paths based on a path length, roller arrangement, and a drive system to enable conveyance of five A4 or B5 half-sized sheets. In page discharge order with the above described processing, the pages are discharged so that an odd-number page faces down, and thus the sheets can be discharged in a correct page order at the time of two-sided copying.

The print output discharged from the discharge roller 317 is transmitted to an inspection apparatus 1000. A print output reading misregistration detection unit 1005 detects the reading misregistration of the print output, and a reader unit 1004 reads image data of the print output. After reading the image data, the print output is transmitted to a finisher 700, and is subjected to bookbinding processing, stapling processing, punching, and the like.

The inspection apparatus 1000 includes an inspection apparatus controller 1100 that controls inspection processing, and communicates with a main body controller 900 that controls the image forming apparatus to notify the main body controller 900 of a job to be reprinted depending on the inspection result. The main body controller 900 and the inspection apparatus controller 1100 can communicate with an external computer 453.

The image forming apparatus may be a color image forming apparatus that forms an color image or a monochrome image forming apparatus that forms a monochrome image. Alternatively, the image forming apparatus may be a 1D-type image forming apparatus including one photosensitive drum, or a 4D-type image forming apparatus including four photosensitive drums. Alternatively, the image forming apparatus may be an electrophotographic image forming apparatus, or an inkjet image forming apparatus.

FIG. 2 is a block diagram illustrating the entire configuration of a control unit in the image forming apparatus illustrated in FIG. 1. In the example, a controller control unit 400 that controls the entire image forming apparatus is centrally configured. Referring to FIG. 2, the controller control unit 400 includes a document feeding device control unit 101 that controls the document feeding device 100 based on setting of an operation unit 800 or an instruction of the external computer 453. Further, the controller control unit 400 communicates with an image reader control unit 201 that controls the image reader 200 to obtain image data of an input document.

The controller control unit 400 communicates with a printer control unit 301 that controls the printer unit 300 to print the image data on a sheet. When page description language (PDL) data is input from the external computer 453, a raster image processor (RIP) unit 500 performs RIP processing on the PDL data.

The image data rasterized by the RIP unit 500 is stored to a document management unit 454. An image to be printed is subjected to image processing for printing with an output image processing unit 600 according to necessity. An external interface (I/F) 451 connects the external computer 453 to the inspection apparatus controller 1100. For example, an external bus 452 of a network or a universal serial bus (USB) is used for the connection, so that print data from the external computer 453 is rasterized and output.

Figure 3:
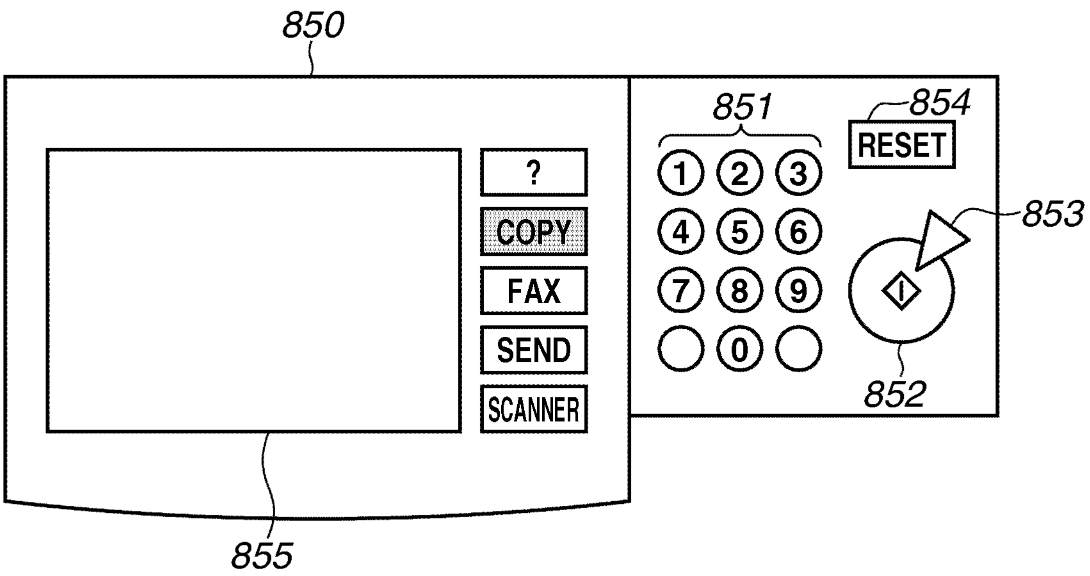
FIG. 3 illustrates a configuration of an operation unit in the image forming apparatus.

FIG. 3 illustrates the configuration of the operation unit 800 in the image forming apparatus in FIG. 1. Referring to FIG. 3, a touch panel sheet is adhered onto a liquid crystal display (LCD) panel of an LCD display unit 855, and the LCD display unit 855 displays an operation screen of the system. Further, when a key displayed on the LCD panel is pressed, positional information thereof is transmitted to the controller control unit 400. A numeric keypad 851 is used to input a number such as a number of copies. A start key 852 is used to start a copying operation or a reading operation of the document after a user set a desired condition. A stop key 853 is used to stop the operation currently executed. A reset key 854 is used to execute resetting with the operation unit 800 by a user.

<Configuration of Inspection Apparatus for Detecting Presence or Absence of Defective Image>

Figure 4:
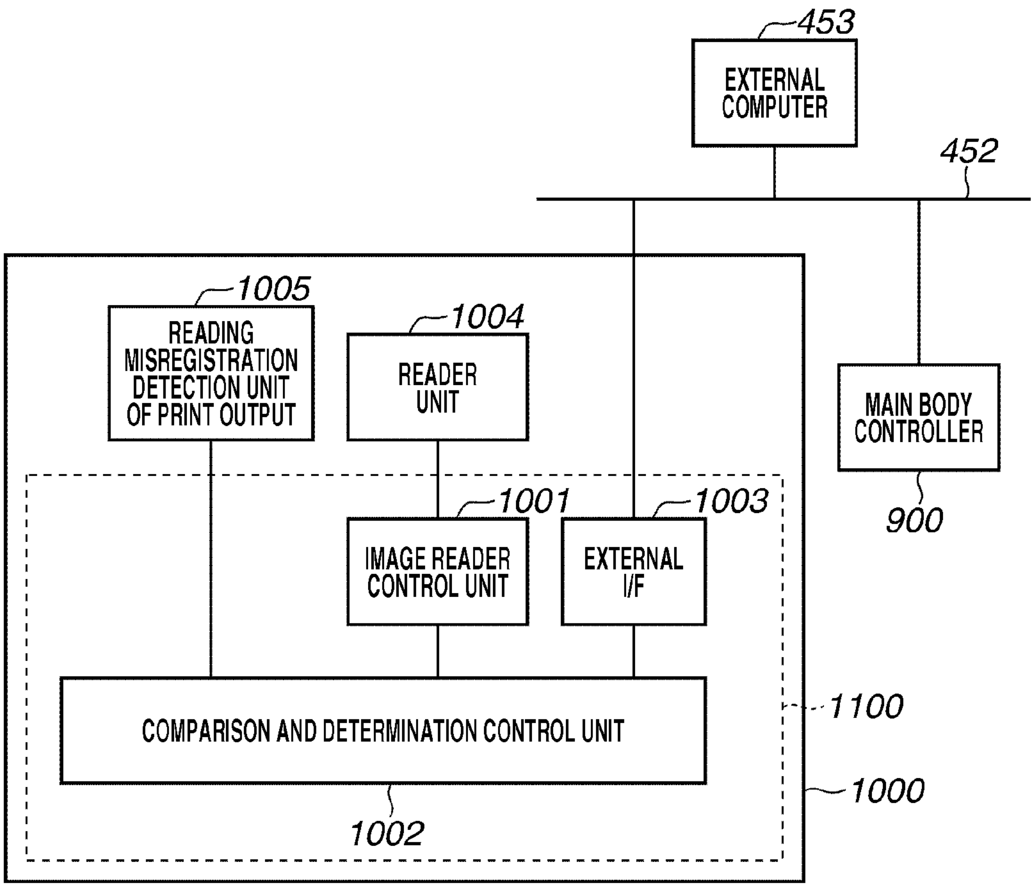
FIG. 4 is a block diagram illustrating a configuration of the inspection apparatus in FIG. 1.

FIG. 4 is a block diagram illustrating a configuration of the inspection apparatus 1000 in FIG. 1. A description is given of processing for detecting presence or absence of a defective image based on a printing result of the image forming apparatus. Referring to FIG. 4, the inspection apparatus 1000 includes an image reader control unit 1001, a comparison and determination control unit 1002 that determines the presence or absence of a defective image, an external I/F 1003, the reader unit 1004, and the print output reading misregistration detection unit 1005.

The image reader control unit 1001 controls the reader unit 1004 that reads image data of a printed matter that is discharged from the main body. The reader unit 1004 includes a line sensor 1004A for a front surface and a line sensor 1004B for a rear surface to read images on the both sides of a print output to be conveyed, as illustrated in FIG. 1. According to the present exemplary embodiment, the reader unit 1004 includes the line sensor 1004B for the rear surface, so that simultaneous inspection of both the front surface and the read surface of the two-sided printed matter.

The external I/F 1003 connects the external computer 453 or the main body, and receives rasterization data stored in the document management unit 454 in the main body. The comparison and determination control unit 1002 compares the image data of the printed matter obtained from the image reader control unit 1001 with the rasterization data obtained from the external I/F 1003 based on reading misregistration data obtained from the print output reading misregistration detection unit 1005, and determines the presence or absence of a defective image.

<Outline of Processing for Detecting Presence or Absence of Printing Defect>

A description is given of processing executed when an output image of a print job is checked (detection of presence or absence of a print defect) with reference to FIGS. 5A to 5C and FIGS. 6A and 6B.

Figure 5A:
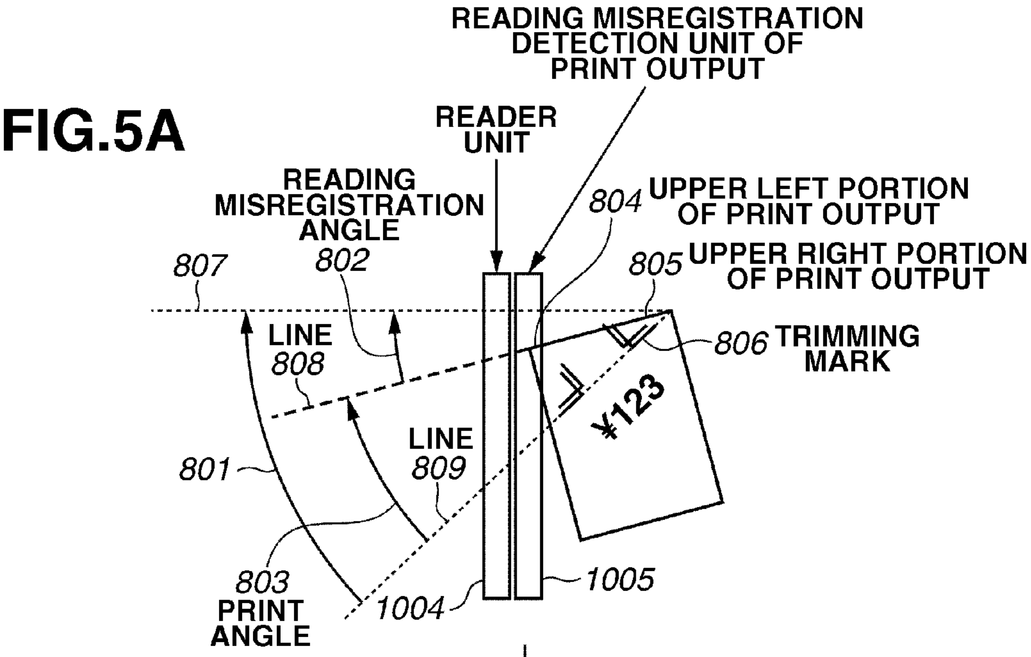
FIGS. 5A to 5C illustrate flows of processing of image data read by the inspection apparatus.
Figure 5B:
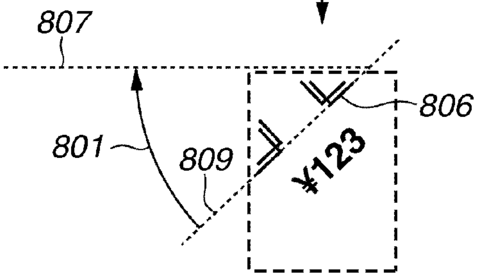
Figure 5C:
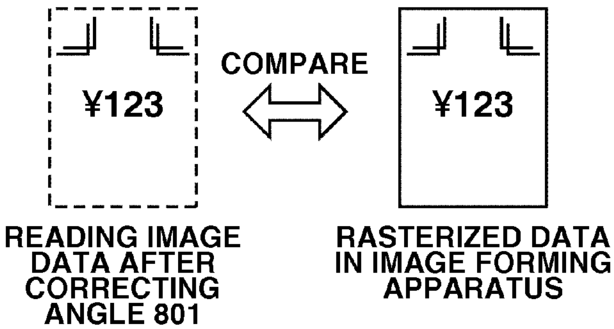

FIGS. 5A to 5C illustrate flows of checking image data read by the reader unit 1004 in the inspection apparatus 1000 in FIG. 1. Referring to FIGS. 5A to 5C, a print angle 801 is on the reading image data in a sheet conveyance direction, an angle 802 is a reading misregistration angle in the sheet conveyance direction when a print output is read, and a print angle 803 is a print position angle to a print output (e.g., a sheet).

FIG. 5A also illustrates a reading status of the print output with respect to the line sensor when the print output is read. FIG. 5B illustrates image data read by the line sensor in the status in FIG. 5A. FIG. 5C illustrates a flow for correcting and comparing the print angle 801.

Next, a description is given of processing executed when the presence or absence of a print defect of the printed matter is detected. In the inspection apparatus 1000, the comparison and determination control unit 1002 performs processing for comparing the image data transmitted from the image reader control unit 1001 with the rasterization image data in the document management unit 454 in the main body transferred from the main body controller 900 in the image forming apparatus.

A user sets a threshold (first threshold or predetermined threshold) of the print angle to a print output, e.g., a sheet using the operation unit 800 and a threshold (second threshold) of a difference amount from the rasterization data in the main body. The main body controller 900 notifies the inspection apparatus controller 1100 of the first and second thresholds set by the operation unit 800, and stores the first and second thresholds to a memory in the comparison and determination control unit 1002 of the inspection apparatus controller 1100. The inspection apparatus controller 1100 may receive the first and second thresholds from the external computer 453, and may set the received first and second thresholds to the memory in the comparison and determination control unit 1002.

After completing the image formation in the image forming apparatus, the print output reading misregistration detection unit 1005 reads the print output to be conveyed from the main body to the inspection apparatus 1000. At this time, the print output reading misregistration detection unit 1005 detects, for example, a print output upper left portion 804 and a print output upper right portion 805. The inspection apparatus controller 1100 calculates an angle formed between a line 807 which is vertical to the print output reading misregistration detection unit 1005 and a line 808 connecting the print output upper left portion 804 and the print output upper right portion 805 (i.e., a line representing the sheet edge). The inspection apparatus controller 1100 detects the reading misregistration angle 802 when a print output 850 is read. The processing is described by assuming that the detected reading misregistration angle 802 is 5°.

FIG. 5B illustrates the image data read by the reader unit 1004. The inspection apparatus controller 1100 calculates a center of gravity of a trimming mark 806 printed together with printing contents by binarizing the read image data with the image reader control unit 1001. The inspection apparatus controller 1100 calculates a coordinate position of the trimming mark according to the center of gravity of the calculated trimming mark 806. Further, the inspection apparatus controller 1100 calculates an angle formed by the line 807 vertical to the print output reading misregistration detection unit 1005 and a line 809 indicating inclination of printing from the coordinate position of the calculated trimming mark, and detects the print angle 801 on the reading image data.

A description is given by assuming that the inspection apparatus controller 1100 detects that the print angle 801 on the reading image data is, e.g., 15°. The inspection apparatus controller 1100 may detect the print angle by detecting an upper end of a character string to detect the print angle on the reading image data.

The inspection apparatus controller 1100 calculates the print angle 803 to the print output (sheet) from the misregistration angle 802 when the print output is read and the print angle 801 on the reading image data as detected above. The inspection apparatus controller 1100 calculates, for example, the print angle 803 by using a formula of (print angle 801)−(misregistration angle 802)=(print angle 803). As a result, in the example, the print angle 803 to the print output (sheet) is calculated as (15°−5°)=10°.

The inspection apparatus controller 1100 compares and determines whether the print angle 803 to the calculated print output (sheet) is less than the first threshold set in advance by the user. Here, it is assumed that the first threshold is 12°. When the image reader control unit 1001 determines that the print angle 803 does not exceed the first threshold, the reading image data read by the reader unit 1004 is subjected to image correction at the print angle 801 on the reading image data, thereby obtaining the image data in a correction state illustrated in FIG. 5C.

In the example, the inspection apparatus controller 1100 determines that the print angle 803 of 10° to the print output (sheet) does not exceed the first threshold of 12°, and performs the image correction.

When the first threshold is set to 8°, the print angle 803 of 10° to the print output (sheet) exceeds the first threshold. Therefore, the inspection apparatus controller 1100 determines that the conveyed print output includes a print defect (NG). The print output that is determined as including the print defect (NG) is conveyed to a sheet discharge unit, and is discharged.

When the inspection apparatus controller 1100 determines that the print output includes a print defect (NG), the inspection apparatus controller 1100 notifies the main body controller 900 of that effect. Thereafter, the main body controller 900 displays a message indicating a print defect notified to the operation unit 800 via a user interface (not illustrated). The main body controller 900 detects that a user presses a button for instructing the reprinting displayed on the user interface, and executes the reprinting of the sheet that is determined as the print defect.

The inspection apparatus controller 1100 compares the reading image data subjected to the image correction with the rasterization image data in the document management unit 454 in the main body to determine whether a difference of the print contents is less than the second threshold set in advance by the user.

When the inspection apparatus controller 1100 determines that the difference of the print contents does not exceed the second threshold, the inspection apparatus controller 1100 determines that the print output does not include the print defect (OK). When the difference of the print contents exceeds the second threshold, the print output is determined as including the print defect (NG). When the inspection apparatus controller 1100 determines that the print output includes the print defect, the main body controller 900 is notified of that effect. Thereafter, the main body controller 900 displays a message indicating a print defect notified to the operation unit 800 via the user interface (not illustrated). The main body controller 900 detects that a user presses a button for instructing the reprinting displayed on the user interface, and executes the reprinting of the sheet that is determined as the print defect.

In step S955, the printing processing may be controlled to be restarted in a state in which the message indicating the print defect is displayed without waiting an instruction to restart printing from the user.

<Flow of Detection Processing of Presence or Absence of Print Defect>

Figure 6A:
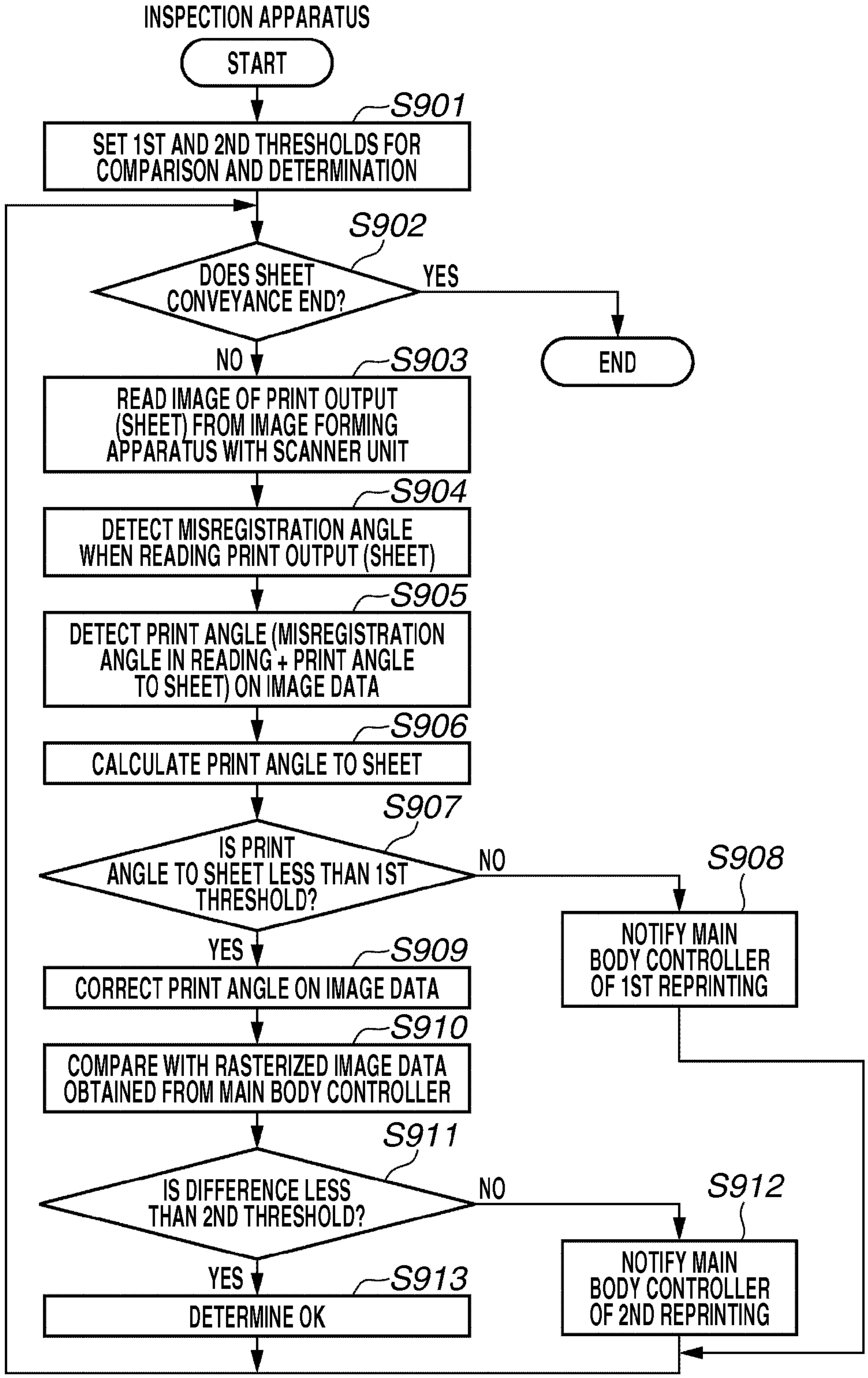
FIGS. 6A and 6B are flowcharts illustrating a control procedure of an inspection system.
Figure 6B:
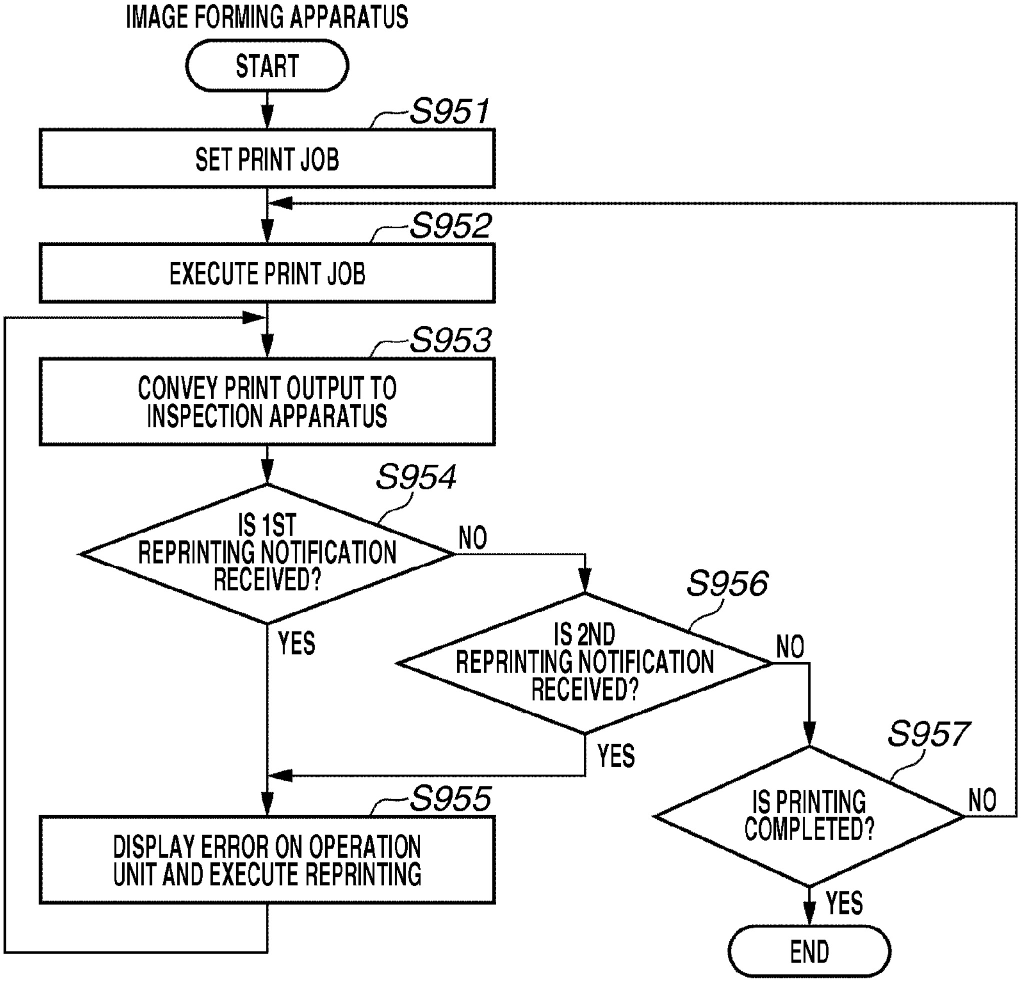

FIGS. 6A and 6B are flowcharts illustrating a control procedure of an inspection system according to the present exemplary embodiment. FIG. 6A illustrates a control procedure of the inspection apparatus 1000, and FIG. 6B illustrates a control procedure of the image forming apparatus. A description is given of processing for calculating the print angle to the sheet from the read image data and executing inspection by matching processing in the inspection apparatus 1000 and processing in the image forming apparatus.

Steps S901 to S913 in FIG. 6A are realized by loading a control program from a read only memory (ROM) to a random access memory (RAM) by a central processing unit (CPU) provided for the inspection apparatus controller 1100 in the inspection apparatus 1000. Processing described in steps in FIG. 6A is mainly executed by the inspection apparatus controller 1100 illustrated in FIG. 4.

Steps S951 to S957 in FIG. 6B are realized by loading a control program from a ROM to a RAM by a CPU provided for the controller control unit 400 in the main body controller 900 of the image forming apparatus. Processing described insteps in FIG. 6B is mainly executed by the main body controller 900 illustrated in FIG. 4.

In step S951, in the image forming apparatus, a user sets a print job using the operation unit 800. In step S952, the controller control unit 400 executes the print job set by the printer unit 300 via the printer control unit 301. In step S953, the controller control unit 400 conveys a printed matter (recording paper or sheet) corresponding to the executed print job to the inspection apparatus 1000. The present exemplary embodiment includes a print job received from the external computer 453 as well as the print job using the operation unit 800.

Thereafter, processing of the inspection apparatus 1000 starts. Before executing the print job, in the inspection apparatus 1000, in step S901, the inspection apparatus controller 1100 acquires first and second thresholds as the reference of comparison and determination which are notified from the main body controller 900, and sets the first and second thresholds to the memory in the comparison and determination control unit 1002.

In step S902, the inspection apparatus controller 1100 determines whether conveyance of the printed matter from the image forming apparatus is completed. If it is determined that conveyance of the printed matter is completed (YES in step S902), the inspection apparatus controller 1100 terminates the present processing. On the other hand, if it is determined that conveyance of the printed matter is not yet completed (NO in step S902), then in step S903, the reader unit 1004 in the inspection apparatus reads the image data of the printed matter.

In step S904, the comparison and determination control unit 1002 detects the reading misregistration angle 802 at the time of reading the print output on which the image data is printed. In step S905, the comparison and determination control unit 1002 detects the print angle 803 of the data from the read image data. In step S906, the comparison and determination control unit 1002 calculates the print angle with respect to the print output (sheet) based on the detected print angle. In step S907, the comparison and determination control unit 1002 determines whether the print angle to the sheet is less than the first threshold by comparison. The case in which the print angle to the sheet is less than the first threshold means that the calculated amount of print misregistration of the read image data is within a correctable range (12° or less according to the present exemplary embodiment).

When the comparison and determination control unit 1002 determines that the print angle to the sheet exceeds the first threshold (NO in step S908), the comparison and determination control unit 1002 detects a defect in the image data of the print output, and processing proceeds to step S908. In step S908, the inspection apparatus controller 1100 notifies the main body controller 900 of first reprinting indicating a print defect (NG) caused by the amount of print misregistration. Then, the processing returns to step S902, and the inspection apparatus controller 1100 waits for the conveyance of the print output reprinted by the image forming apparatus.

At this point, in the image forming apparatus, in step S954, the main body controller 900 determines whether a notification of the print defect is received from the inspection apparatus controller 1100. If the main body controller 900 determines that the notification of the print defect is not received (NO in step S954), the present processing will be terminated.

On the other hand, if the main body controller 900 determines that the notification of the print defect is received (YES in step S954), then in step S955, the controller control unit 400 displays the print defect on the operation unit 800 to notify the user of that effect. Further, the main body controller 900 causes the printer unit 300 to reprint the corresponding rasterized page according to page information (page information to be reprinted) included in the print defect notification, and the processing returns to step S953. In step S953, the main body controller 900 conveys the print output of the page whose reprinting is instructed to the inspection apparatus 1000.

On the other hand, in step S907, if the comparison and determination control unit 1002 determines that the print angle to the sheet does not exceed the first threshold (YES in step S907), the processing proceeds to step S909. In step S909, the comparison and determination control unit 1002 corrects the print angle 803 on the reading image data from the state in FIG. 5B to the state in FIG. 5C. In other words, the comparison and determination control unit 1002 corrects the print angle 803 on the reading image data from the state in FIG. 5B to the image data illustrated in FIG. 5C, that is, the image data comparable with the print data in the image forming apparatus 300.

In step S910, the comparison and determination control unit 1002 compares the image data rasterized in the main body acquired from the main body controller 900 with the corrected image data to calculate a difference amount therebetween. In step S911, the comparison and determination control unit 1002 determines whether the difference amount between the image data rasterized in the main body to be acquired from the main body controller 900 and the corrected image data is less than the second threshold. The difference amount means, for example, a difference in number of dots between the image data rasterized in the main body and the corrected image data.

When the comparison and determination control unit 1002 determines that the difference amount exceeds the second threshold (NO in step S911), the processing proceeds to step S912. In step S912, the comparison and determination control unit 1002 notifies the main body controller 900 of second reprinting indicating a print defect (NG) caused by unmatching between the corrected image data and the rasterization image data. Then the processing returns to step S902, and the inspection apparatus controller 1100 waits for conveyance of the print output reprinted by the image forming apparatus.

In step S956, if the main body controller 900 determines that the notification of the print defect is received (YES in step S956), then in step S955, the controller control unit 400 displays the print defect on the operation unit 800. Further, the main body controller 900 causes the printer unit 300 to reprint the corresponding rasterized page according to page information (page information to be reprinted) included in the print defect notification, and the processing returns to step S953. In step S953, the main body controller 900 conveys the print output of the page whose reprinting is instructed to the inspection apparatus 1000.

In step S956, if the main body controller 900 determines that the notification of the print defect is not received (NO in step S956), the processing proceeds to step S957. In step S957, the main body controller 900 determines whether the printing is completed. When it is determined that the printing is completed (YES in step S957), the main body controller 900 ends the processing in the present flowchart. When it is determined that the printing is not completed yet (NO in step S957), the main body controller 900 returns the processing to step S952.

In step S911, if the comparison and determination control unit 1002 determines that the print angel is less than the second threshold (determines that the printing is normal) (YES in step S911), the processing proceeds to step S913. In step S913, the inspection apparatus controller 1100 determines that the print status of the conveyed print output is OK (no defect), and the processing returns to step S902 in which the inspection processing of the print output to be next conveyed is repeated.

With the above described control, in the automatic inspection, the present exemplary embodiment can avoid erroneously determining as the print defect (NG) due to small misregistration (the print angle of the first threshold or less) although contents of the image data are correct.

Further, according to the present exemplary embodiment, when the print angle of image data exceeds the first threshold and is displaced, the print output on which the image data is printed can be determined as the print defect (NG) without performing correction (rotation processing) of the image data. Therefore, the time for the inspection processing can be reduced. Setting of the above described first threshold can be changed by a user. Thus, the user can set an angle of an allowable range of the misregistration of the print angle as the first threshold.

According to the first exemplary embodiment, when the inspection apparatus 1000 performs the comparison processing, the inspection apparatus 1000 detects the print angle on the reading image data and the reading misregistration angle when reading the printed recording medium, calculates the print angle to the sheet based on the detected angle, and compares and determines the calculated print angle with the first threshold.

On the other hand, according to a second exemplary embodiment, a print position on reading image data and a reading misregistration position when reading the printed recording medium are detected, a print position to a sheet is calculated based on the detection results, and the calculation result is compared with a first threshold. For example, when the print position of the reading image data is larger than the first threshold, the first reprinting may be notified to the main body controller 900 without correcting the print position of the image data. An image print position and image printing contents may be inspected as well as the printing.

Thus, the image print position, the image printing contents, the print position, and the print contents on the recording medium can be targets of comparison and determination.

A configuration of the configuration of the image forming apparatus according to the present exemplary embodiment is illustrated in FIGS. 1 to 6B, and is similar to that in the first exemplary embodiment, so that the description thereof is not repeated.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-278501 filed Dec. 8, 2009, which is hereby incorporated by reference herein in its entirety.

What is claimed is:

1. A detecting apparatus for inspecting a print status of an image printed on a sheet by a printing apparatus, the detecting apparatus comprising:

a reading unit configured to read the image printed on the sheet by the printing apparatus;

a calculating unit configured to calculate a print misregistration amount of the image printed on the sheet with respect to the sheet based on image data read from the sheet by the reading unit;

a determining unit configured to determine whether the print misregistration amount calculated by the calculating unit is larger than a predetermined threshold;

a correcting unit configured to correct, when the determining unit determines that the print misregistration amount is less than or equal to the predetermined threshold, the image data read by the reading unit to image data comparable with image data rasterized by the printing apparatus to determine the print status of the image; and a detecting unit configured to detect, when the determining unit determines that the print misregistration amount of the image printed on the sheet is larger than the predetermined threshold, an abnormality of the print status of the image read by the reading unit without performing correction by the correcting unit.

2. The detecting apparatus according to claim 1, further comprising:

an instructing unit configured to instruct, when the determining unit determines that the print misregistration amount of the image data printed on the sheet is larger than the predetermined threshold, the printing apparatus to reprint the image data.

3. The detecting apparatus according to claim 1, further comprising:

a changing unit configured to change the predetermined threshold in response to an instruction from a user.

4. The detecting apparatus according to claim 1, further comprising a comparison and determination control unit configured:

to calculate a difference amount between the image data corrected by the correcting unit and the image data obtained from the printing apparatus, judge whether the calculated difference amount exceeds a preset second threshold, and find, when the difference amount exceeds the preset second threshold, the abnormality of the print status of the image read by the reading unit.

5. The detecting apparatus according to claim 4, further comprising:

a re-printing instruction unit configured to instruct, when the comparison and determination control unit judges that the difference amount exceeds the preset second threshold, the printing apparatus to reprint the image data.

6. A control method for controlling a detecting apparatus for inspecting a print status of an image printed on a sheet by a printing apparatus, the control method comprising:

causing a reading unit to read the image printed on the sheet by the printing apparatus;

calculating a print misregistration amount of the image printed on the sheet with respect to the sheet based on image data read from the sheet by the reading unit;

determining whether the print misregistration amount calculated in the calculating step is larger than a predetermined threshold;

correcting, when it is determined in the determining step that the print misregistration amount is less than or equal to the predetermined threshold, the image data read by the reading unit to image data comparable with image data rasterized by the printing apparatus to determine the print status of the image; and detecting, when it is determined in the determining step that the print misregistration amount of the image printed on the sheet is larger than the predetermined threshold, an abnormality of the print status of the image read by the reading unit without performing correction in the correcting step.

7. A computer readable storage medium for storing computer-executable instructions for controlling a detecting apparatus for inspecting a print status of an image printed on a sheet by a printing apparatus, the computer-executable instructions comprising:

instructions to cause a reading unit to read the image printed on the sheet by the printing apparatus;

instructions to calculate a print misregistration amount of the image printed on the sheet with respect to the sheet based on image data read from the sheet by the reading unit;

instructions to determine whether the print misregistration amount calculated in the calculating step is larger than a predetermined threshold;

instructions to correct, when it is determined in the determining step that the print misregistration amount is less than or equal to the predetermined threshold, the image data read by the reading unit to image data comparable with image data rasterized by the printing apparatus to determine the print status of the image; and instructions to detect, when it is determined that the print misregistration amount of the image print on the sheet is larger than the predetermined threshold, an abnormality of the print status of the image read by the reading unit without performing the correction.

* * * * *